United States Patent
Sheng

(10) Patent No.: US 6,477,265 B1
(45) Date of Patent: Nov. 5, 2002

(54) SYSTEM TO POSITION DEFECT LOCATION ON PRODUCTION WAFERS

(75) Inventor: Han-Ming Sheng, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 09/206,737

(22) Filed: Dec. 7, 1998

(51) Int. Cl.[7] ................................................. G06K 9/00
(52) U.S. Cl. ................... 382/145; 382/149; 382/181; 382/284; 382/294; 348/79; 348/130; 345/629; 250/491.1; 250/559.2
(58) Field of Search ............................ 382/145, 149, 382/147, 181, 190, 189, 294, 284, 287; 348/68, 79, 130; 250/283, 491.1, 559.18; 430/30, 34; 356/237.1, 239.8, 237.4

(56) References Cited

U.S. PATENT DOCUMENTS

| | | | |
|---|---|---|---|
| 4,160,263 A | * 7/1979 | Christy et al. ................. 348/79 |
| 4,377,340 A | * 3/1983 | Green et al. ............ 250/559.08 |
| 4,586,822 A | * 5/1986 | Tanimoto .................... 356/394 |
| 4,845,558 A | 7/1989 | Tsai et al. .................... 358/106 |
| 5,153,668 A | * 10/1992 | Katzir et al. ............. 356/237.2 |
| 5,479,252 A | 12/1995 | Worster et al. ............. 356/237 |
| 5,649,169 A | 7/1997 | Berezin et al. ............. 395/500 |
| 5,777,327 A | * 7/1998 | Mizuno ....................... 250/310 |
| 5,808,910 A | * 9/1998 | Irie et al. ................. 250/491.1 |
| 5,863,680 A | * 1/1999 | Kawakubo et al. ........... 430/22 |
| 5,864,394 A | * 1/1999 | Jordan, III et al. ...... 356/237.2 |
| 6,002,792 A | * 12/1999 | Oguri et al. ................. 382/145 |
| 6,018,392 A | * 1/2000 | Tzu et al. .................... 356/357 |
| 6,067,153 A | * 5/2000 | Mizuno ....................... 356/394 |
| 6,141,107 A | * 10/2000 | Nishi et al. ................. 250/548 |
| 6,188,785 B1 | * 2/2001 | Nakamura et al. .......... 382/149 |

* cited by examiner

Primary Examiner—Leo Boudreau
Assistant Examiner—Sheela Chawan
(74) Attorney, Agent, or Firm—George O. Saile; Stephen B. Ackerman; Larry J Prescott

(57) ABSTRACT

A system and method for detecting defects in integrated circuit wafers related to photolithographic processing of the wafers. The system has an image processor, or image computer, and an image memory, which has image data for production wafer types stored therein. A defect detection wafer is scanned by an objective lens and the image is detected by an image detector. The image detector data output is fed to the image processor along with image data for a selected production wafer type from the memory. The image processor feeds image data to a visual display which displays a superimposed image of the defect detection wafer and the selected production wafer type. This superimposed image makes it easier to detect actual defects in a production wafer.

12 Claims, 3 Drawing Sheets

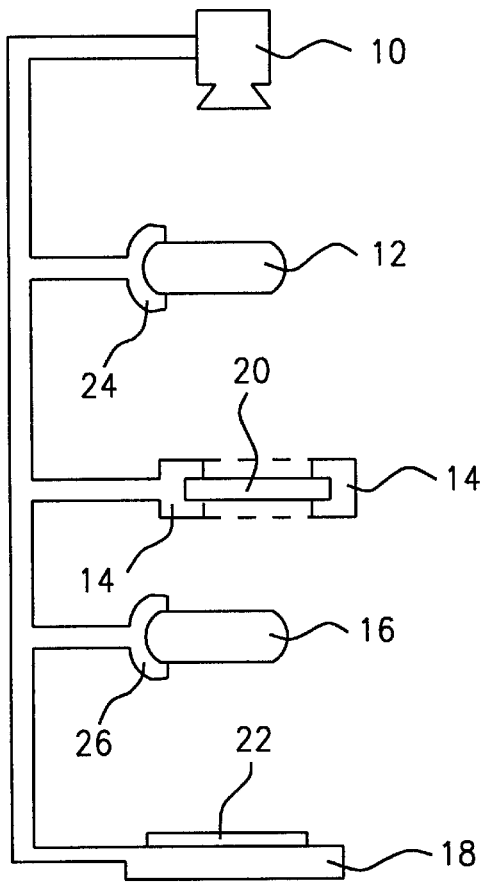
FIG. 1
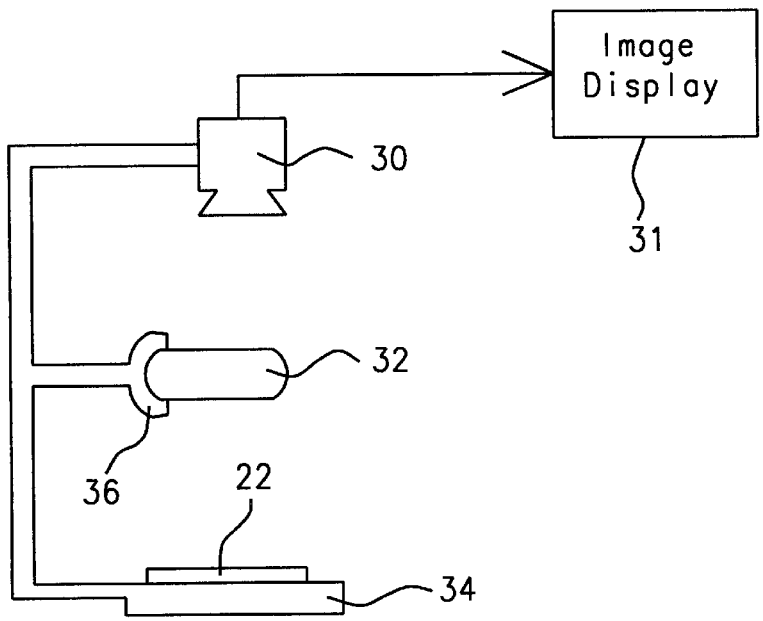
FIG. 2 - Prior Art

SYSTEM TO POSITION DEFECT LOCATION ON PRODUCTION WAFERS

BACKGROUND OF THE INVENTION (1) Field of the Invention

This invention relates to a system and method for the inspection of defect detection wafers and transferring the defect data to different production wafer types.

(2) Description of the Related Art

It is important to be able to identify defective portions of integrated circuit wafers during the processing of the wafers. Inspection systems, particularly automatic inspection systems which can identify and locate such defects are of considerable interest.

U.S. Pat. No. 5,649,169 to Berezin et al. describes a method and system for declustering defect data in cooperation with wafer scanning tools. This declustering allows the system to remove noise in defect data caused by wafer scratches and the like.

U.S. Pat. No. 5,479,252 to Worster et al. describes a laser imaging system used to analyze defects on semiconductor wafers that have been detected by defect detection systems.

U.S. Pat. No. 4,845,558 to Tsai et al. describes a method and apparatus for inspecting repeating pattern devices. Data is resolved from selected pixels and directly compared either to data obtained from corresponding pixels or a data base.

SUMMARY OF THE INVENTION

Defect identification systems are often used to monitor integrated circuit wafers for defects during the fabrication process. FIG. 1 shows a schematic view of a projection system used to project mask patterns on a wafer being processed. The key elements of such a system are a light source 10, a condenser lens 12, a mask having the pattern to be projected 20 and held in place by a mask holder 14, an objective lens 16, and a wafer holder 18 holding the wafer 22 being processed. An objective lens holder 26 and a condenser lens holder 24 hold the objective lens 16 and the condenser lens 12 in place. It is possible for foreign particles to become attached to the wafer holder 18, or wafer stage, resulting in defective wafers. To monitor for these types of defects defect detection wafers are periodically processed through the projection system and analyzed for defects. If the analysis of the detect detection wafer shows that defects have occurred, the production wafers processed between that defect detection wafer and the previous defect detection wafer must be carefully inspected for defects.

FIG. 2 shows a schematic view of a conventional system for inspecting the defect detection wafers for defects. FIG. 2 shows a defect detection wafer under inspection 22 being held in place on a movable wafer holder 34, a moveable objective lens 32 held in place by a movable lens holder 36, and an image detector 30, such as a CCD camera. The movable objective lens 32 and the movable wafer holder 34 are moved relative to each other so that the objective lens scans the entire surface of the defect detection wafer 22. The output of the objective lens 32 is directed to the CCD camera 30 and a visual display 31 so that the image of the wafer surface can be observed for defects. If defects are found on the defect detection wafer then the production wafers processed between this defect detection wafer and the previous defect detection wafer must be carefully inspected for defects.

One of the problems that occur with this method of defect detection and inspection is that the defect detection wafer and the production wafers are usually quite different. Usually many different types of production wafers are processed between successive defect detection wafers. This problem can be better understood with reference to FIGS. 3 and 4. FIG. 3 shows a top view of a defect detection wafer 22a showing a number of chip sites 50 and a defect 52 occurring on the wafer. FIG. 4 shows a top view of a production wafer 22b showing chip sites 54 and the defect 52 occurring on the same location on the wafer. Although the defect 52 is in the same location on the production wafer 22b as on the defect detection wafer 22a, the locations do not appear the same because of the difference in the patterns on the defect detection wafers and on the production wafers. This difference in patterns make it difficult for operators to locate defects on production wafers based on information from defects on defect detection wafers, especially if the defects are subtle.

It is a primary objective of this invention to provide a system that translates defect information from defect detection wafers to production wafers so that the production wafers can easily be inspected for defects.

It is another primary objective of this invention to provide a method to translate defect information from defect detection wafers to production wafers so that the production wafers can easily be inspected for defects.

These objectives are achieved by providing an image memory in which image data of production wafers can be stored. The output of the image detector, such as a CCD camera or CCD scanner, is fed to an image processor unit which is connected to the image memory. The output of the image processor is fed to an image display. When the inspection of a defect detection wafer identifies a defect the image processor can select image data for a particular production wafer and superimpose the image data for the production wafer on the image data for the defect detection wafer. The image display will then display the image of the defect as it will appear on the production wafer. Operators or automatic inspection equipment can then easily inspect production wafers for the defect.

BRIEF DESCRIPTION OF THE DRAWINGS

FIG. 1 shows a schematic view of a projection system used to transfer mask patterns to a wafer surface.

FIG. 2 shows a schematic view of a conventional inspection system.

DESCRIPTION OF THE PREFERRED EMBODIMENTS

Figure 3:
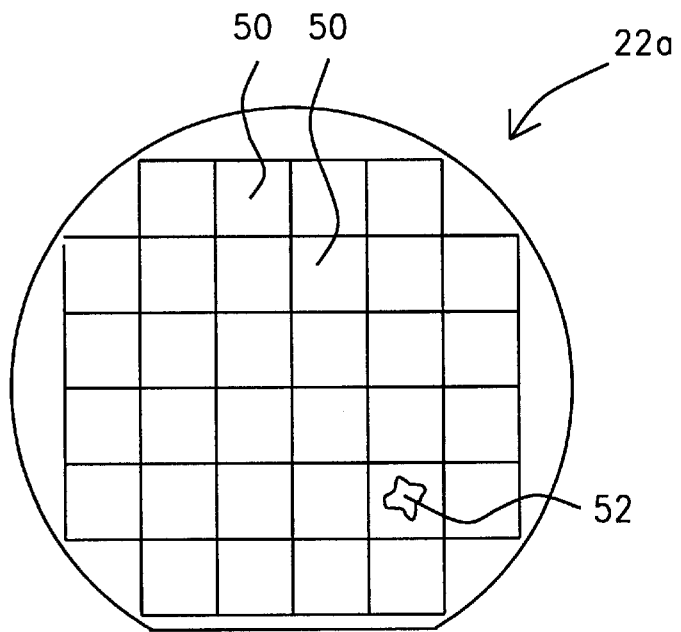
FIG. 3 shows a top view of a defect detection wafer.
Figure 4:
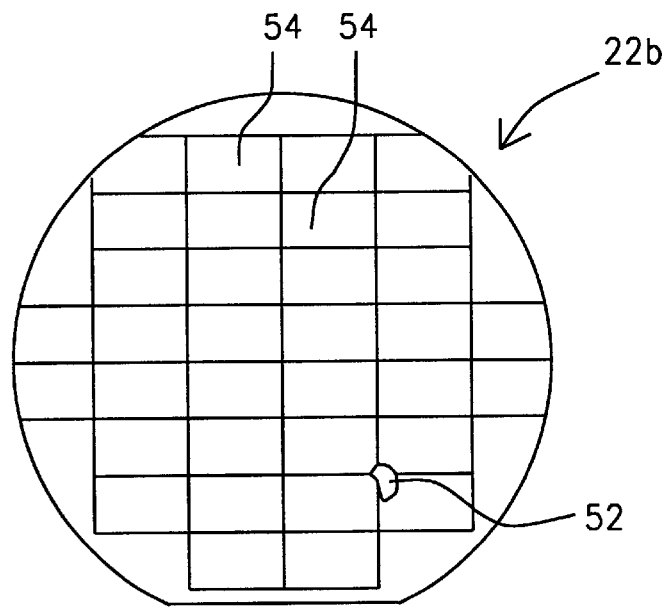
FIG. 4 shows a top view of a production wafer.
Figure 5:
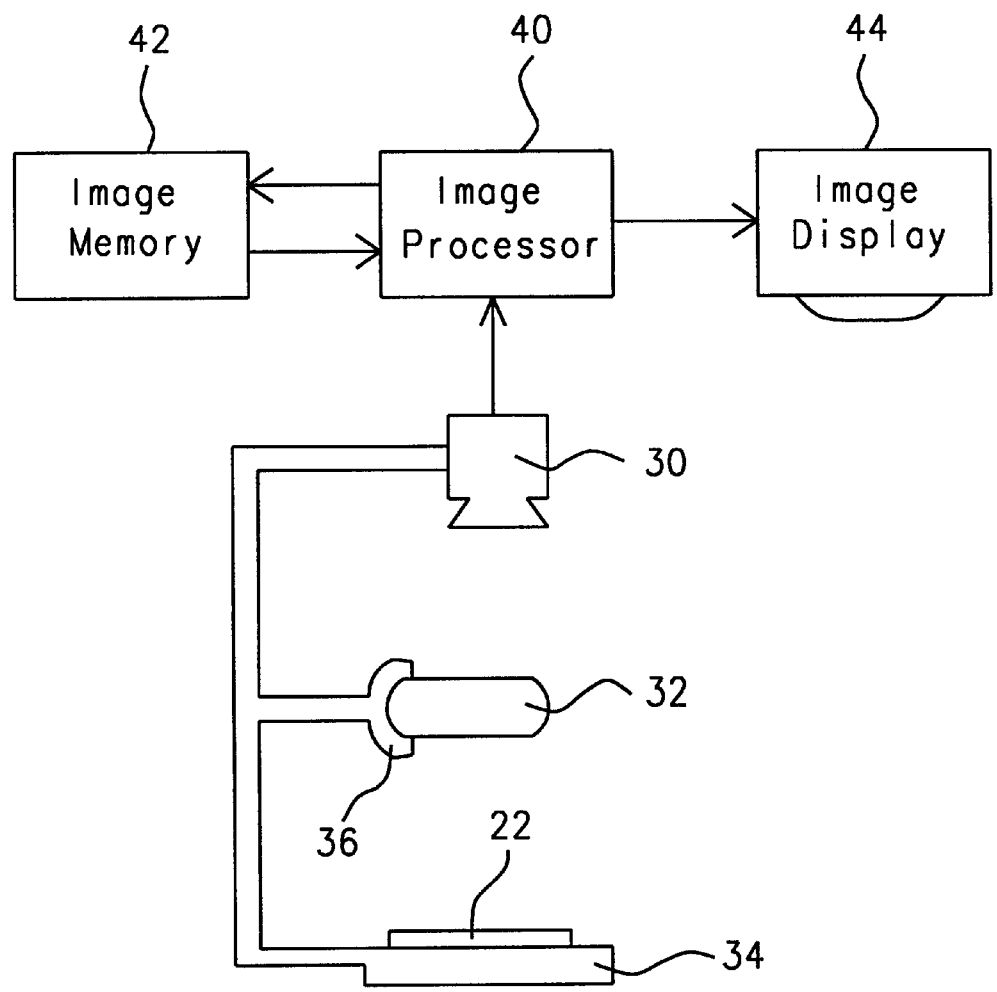
FIG. 5 shows a schematic view of the defect inspection system of this invention.

Refer now to FIGS. 3–5 for a description of the apparatus and method of this invention for inspecting wafers. FIG. 3 shows a top view of a defect detection wafer 22a showing a number of chip sites 50 and a defect 52 occurring on the wafer. FIG. 4 shows a top view of a production wafer 22b showing chip sites 54 and the defect 52 occurring on the same location on the wafer.

FIG. 5 shows a schematic view of the defect detection system of this invention. FIG. 5 shows a wafer under inspection 22, either a defect detection wafer or a production wafer, being held in place on a movable wafer holder 34, a moveable objective lens 32 held in place by a movable lens holder 36, and an image detector 30. The image detector 30 can be a CCD camera, a CCD scanner, or the like. The movable objective lens 32 and the movable wafer holder 34 are moved relative to each other so that the objective lens scans the entire surface of the wafer under inspection 22. The output of the objective lens 32 is directed to the image detector 30.

The defect detection system up to this point of the description is the same as the conventional defect detection system. Key elements of the defect detection system of this invention are an image processor 40, an image memory 42, and an image display 44. The image detector 30 has a optical input and a data output. The image processor 40, which is an image computer, has a first input, a second input, a first output, and a second output. The first input of the image processor 40 is connected to the data output of the image detector 30. The image memory 42 has an input, which is connected to the first output of the image processor 40, and output, which is connected to the second input of the image processor 40. The image display 44 has a data input and a visual output. The data input of the image display 44 is connected to the second output of the image processor 40.

Image data for the production wafers being processed is stored in the image memory 42. This image data can be entered into the image memory 42 by placing production wafers on the wafer holder 34, scanning the production wafer with the objective lens 32, and feeding the visual data from the image processor 40 to the image memory 42 to be stored. The production wafer image data could also be fed directly to the image memory from the image data used to fabricate the masks used in the fabrication of the production wafers. The wafer image data for a particular production wafer can be selected and fed into the image processor at the command of the image processor.

The image processor 40 takes image data provided by the data output of the image detector 30 and image data for a selected production wafer from the image memory 42, combines this image data in the image processor 40, and feeds image data for a superimposed image of the selected production wafer and the image detected by the image detector to the data input of the image display 44. The visual output of the image display 44 displays the superimposed images of the selected production wafer and the image detected by the image detector 30.

The method of the wafer inspection proceeds as follows, see FIG. 5. A defect detection wafer 22 is placed on the movable wafer holder 34. The objective lens 32 scans the surface of the defect detection wafer and the scanned image is detected by the image detector 30. The image detector 30 feeds the image data for the defect detection wafer to the image processor 40 and the image processor 40 feeds the image to the image display 44. The visual output of the image display 44 is then observed for defects. If defects are found, image data for production wafers are selected from the image memory 42 and fed to the image processor 40.

The image processor then superimposes the image data for the selected production wafer and the defect detection wafer and feeds the superimposed data to the data input of the image display 44. The visual output of the image display 44 then displays the superimposed images of the defect detection wafer and the selected production wafer. The superimposed images make it an easy matter to inspect the selected production wafers produced since the previous inspection of a defect detection wafer. Other production wafers are then selected and the process is repeated until inspection of all of the production wafers produced since the previous inspection of a defect detection wafer has been completed.

While the invention has been particularly shown and described with reference to the preferred embodiments thereof, it will be understood by those skilled in the art that various changes in form and details may be made without departing from the spirit and scope of the invention.

What is claimed is:

1. A method of inspecting wafers, comprising:

providing a movable wafer holder;

providing a movable objective lens having an input side and an output side, wherein said movable objective lens and said movable wafer holder can be moved relative to each other;

providing an image memory having an input and an output;

providing an image detector having an optical input and a data output;

providing an image processor having a first input, a second input, a first output, and a second output, wherein said second output of said image processor superimposes the image data at said first input of said image processor and the image data at said second input of said image processor;

providing an image display having a data input and a visual output wherein said visual output of said image display provides a visual display of the image data at said data input of said image display;

connecting said first input of said image processor to said data output of said image detector unit, said second input of said image processor to said output of said image memory, said first output of said image processor to said input of said image memory, and said second output of said image processor to said input of said image display;

storing image data for a number of reference wafers in said image memory;

selecting one of said reference wafers;

directing said image data for said selected reference wafer to said output of said image memory and to said second input of said image processor;

placing a wafer to be inspected in said wafer holder;

directing light exiting said output side of said movable objective lens to said optical input of said image detector;

moving said movable objective lens relative to said movable wafer holder so that input side of said objective lens scans said wafer to be inspected; and observing said visual output of said image display thereby observing the superimposed images of said wafer to be inspected and said selected reference wafer.

2. The method of claim 1 wherein said image detector is a CCD camera.

3. The method of claim 1 wherein said image detector is a CCD scanning unit.

4. The method of claim 1 wherein said image processor is a computer.

5. The method of claim 1 wherein said reference wafers are production wafers.

6. The method of claim 1 wherein said wafer to be inspected is a defect detection wafer.

7. A system to inspect wafers, comprising:

a movable wafer holder which can hold a wafer under inspection;

a movable objective lens having an input side and an output side, wherein said movable objective lens and said movable wafer holder can be moved relative to each other so that said input side of said objective lens scans said wafer under inspection;

an image detector having an optical input and a data output wherein light exiting said output side of said movable objective lens enters said optical input of said image detector;

an image memory having an input and an output;

image data for a number of reference wafers stored in said image memory;

an image processor having a first input, a second input, a first output, and a second output, wherein said first input of said imaging processor is connected to said data output of said image detector, said second input of said image processor is connected to said output of said image memory, said first output of said image processor is connected to said input of said image memory, and said second output of said image processor superimposes image data for said wafer under inspection and image data for a reference wafer selected from said number of said reference wafers stored in said image memory;

an image display having a data input and a visual output wherein said data input of said image display is connected to said second output of said image processor and said visual output of said image display provides a visual display of the superimposed images of said wafer under inspection and said selected reference wafer.

8. The system of claim 7 wherein said image detector is a CCD camera.

9. The system of claim 7 wherein said image detector is a CCD scanning unit.

10. The system of claim 7 wherein said image processor is a computer.

11. The system of claim 7 wherein said reference wafers are production wafers.

12. The system of claim 7 wherein said wafer to be inspected is a defect detection wafer.

* * * * *